United States Patent
Shoji

(10) Patent No.: US 7,072,379 B1
(45) Date of Patent: Jul. 4, 2006

(54) TRANSMISSION CIRCUIT

(75) Inventor: Takashi Shoji, Tokyo (JP)

(73) Assignee: NEC Corporation, Tokyo (JP)

( * ) Notice: Subject to any disclaimer, the term of this patent is extended or adjusted under 35 U.S.C. 154(b) by 783 days.

(21) Appl. No.: 10/069,222

(22) PCT Filed: Aug. 24, 2000

(86) PCT No.: PCT/JP00/05689

§ 371 (c)(1),
(2), (4) Date: Feb. 22, 2002

(87) PCT Pub. No.: WO01/15367

PCT Pub. Date: Mar. 1, 2001

(30) Foreign Application Priority Data

Aug. 24, 1999 (JP) ................................. 11/236946

(51) Int. Cl.
H04B 1/69 (2006.01)

(52) U.S. Cl. ........................ 375/130; 375/146; 370/342

(58) Field of Classification Search ................ 375/140, 375/142, 143, 150, 130, 296, 141, 149, 222, 375/354, 371; 370/335, 208, 342, 441, 347, 370/442, 337, 320, 517, 503, 516; 342/56, 342/125, 58; 327/141, 156, 160
See application file for complete search history.

(56) References Cited

U.S. PATENT DOCUMENTS

| 4,193,073 | A | * | 3/1980 | Kohnen ........................ 342/56 |
| 4,805,195 | A | * | 2/1989 | Keegan ....................... 375/354 |
| 5,568,472 | A | * | 10/1996 | Umeda et al. ............... 370/342 |
| 5,619,504 | A | * | 4/1997 | Van Grinsven et al. ..... 370/347 |
| 5,689,525 | A | * | 11/1997 | Takeishi et al. ............. 375/141 |
| 5,914,947 | A | * | 6/1999 | Saito ........................... 370/337 |
| 5,943,331 | A | * | 8/1999 | Lavean ........................ 370/335 |
| 5,960,028 | A | * | 9/1999 | Okamoto et al. ........... 375/130 |
| 6,101,197 | A | * | 8/2000 | Keeth et al. ................. 370/517 |
| 6,307,877 | B1 | * | 10/2001 | Philips et al. ................ 375/130 |
| 6,346,837 | B1 | * | 2/2002 | Shibayama .................. 327/156 |
| 6,349,109 | B1 | * | 2/2002 | Lattard et al. ............... 375/140 |

FOREIGN PATENT DOCUMENTS

| JP | 4-196813 | 7/1992 |
| JP | 10-117165 | 5/1998 |
| JP | 10-261942 | 9/1998 |
| JP | 10-271059 | 10/1998 |
| JP | 11-145917 | 5/1999 |

* cited by examiner

Primary Examiner—Temesghen Ghebretinsae
Assistant Examiner—Jacob Meek
(74) Attorney, Agent, or Firm—Foley & Lardner LLP

(57) ABSTRACT

This transmission circuit is used in, for example, a base station in CDMA mobile communication. The transmission circuit has a first delay circuit section which gives a delay to an input signal (spread signal) with a predetermined resolution, and a second delay circuit section gives a delay to the output signal of the first delay circuit section with a higher resolution than the predetermined resolution. A control section computes a first delay amount which is a maximum value that does not exceed a predetermined delay amount and can be given by a delay of the predetermined resolution, instructs the first delay circuit section the first delay amount, computes a second delay amount which is the first delay amount subtracted from the predetermined delay amount and instructs the second delay circuit section the second delay amount. By adjusting a transmission timing this way, it is possible to adjust the transmission timing among a plurality of base stations while reducing the circuit scale.

5 Claims, 3 Drawing Sheets

TRANSMISSION CIRCUIT

TECHNICAL FIELD

The present invention relates to a transmission circuit for use in CDMA communication, and, more particularly, to a transmission circuit capable of adjusting a transmission timing by a delay in CDMA mobile communication.

BACKGROUND ART

In a code division multiple access (CDMA) system, a transmitter spreads an information sequence to be transmitted in the same frequency band by using different spread codes channel by channel and transmits it as a transmission signal, and a receiver receives the transmission signal as a reception signal and despreads the reception signal with the same spread code as used in transmission to acquire the information sequence.

In the most basic direct spread CDMA system, every information sequence to be transmitted in the same frequency band is spread by different spread codes and codes which have both excellent auto-correlation and cross-correlation are normally used as spread codes.

When a mobile unit moves over areas covered by a plurality of base stations in case where the CDMA system is adapted to mobile communication, a process called handover which switches the base station that retains the mobile unit is carried out. Hand-over in the CDMA system generally takes a scheme of receiving transmission signals from both the base station of a handing-over side and the base station of a handed-over side and sequentially shifting the reception ratio from the base station of the handing-over side to the base station of the handed-over side, whereby hand-over without interruption of a received information sequence is executed.

By the way, a mobile unit receives a synthesized wave of a plurality of frequency- and time-multiplexed transmission signals as a reception signal, though individual spread codes are different, and acquires an information sequence addressed to itself by performing despreading with a predetermined spread code. If a reception circuit is designed to have a plurality of despreading circuits, therefore, the reception circuit can receive a plurality of information sequences.

In this case, if the transmission timing differs base station by base station, a mobile unit needs to match the timings of the transmission signals from both base stations. As a result, the amount of information to be stored increases. That is, the size of a memory or the like for storing information increases, which is inconvenient for a mobile unit that needs to be made compact. It is therefore desirable that the transmission timings of both base stations should perfectly coincide with each other.

To match the transmission timings, base stations generally transmit transmission signals at a specific timing on the absolute time using GPS and it is necessary to define the absolute time at the transmission antenna end of each base station in order to completely match the transmission timings of the individual base stations with one other.

However, not every base station can be sited under the same site conditions, and the feeder line length to the antenna from the transmission device of a base station often differs from one base station to another.

To match the heads of the periods of spread codes, the heads of the spread codes need to be adjustable to an arbitrary timing. In general, this kind of timing adjustment uses a memory, such as a FIFO memory, and spread codes for a predetermined delay are stored in the memory, after which spread signals are output from the memory. That is, a circuit, such as a FIFO memory, for sampling information for one period of a spread code with the resolution for adjustment with predetermined precision and storing it is needed.

To ensure adjustment with high precision by increasing the resolution, however, the circuit scale of a base station increases, leading to a cost increase. In case where the period of a spread code is 64 octets, for example, the capacity of a FIFO memory or the like needed increases to 256 octets from 64 octets in order to increase the resolution quadruple.

The invention aims at providing a transmission circuit for CDMA communication which can adjust the transmission timing while reducing the circuit scale.

DISCLOSURE OF INVENTION

The invention provides a transmission circuit for transmitting an input signal which is given a predetermined delay amount, characterized by having first delay means for giving a delay of a predetermined resolution to the input signal, second delay means for giving a higher delay than the predetermined resolution to an output signal of the first delay means, and control means for computing a first delay amount which is a maximum value that does not exceed the predetermined delay amount and can be given by a delay of the predetermined resolution, instructing the first delay means the first delay amount, computing a second delay amount which is the first delay amount subtracted from the predetermined delay amount and instructing the second delay means the second delay amount.

Further, the invention provides a transmission circuit to be used in a mobile communications system for transmitting transmission signals from a plurality of base stations with a matched transmission timing, characterized in that each of the base stations is equipped with first delay means for giving a delay of a predetermined resolution to an input signal, second delay means for giving a delay to an output signal of the first delay means with a higher resolution than the first delay means, and control means for computing a first delay amount which is a maximum value that does not exceed a predetermined delay amount and can be given by the predetermined resolution, instructing the first delay means the first delay amount, computing a second delay amount which is the first delay amount subtracted from the predetermined delay amount and instructing the second delay means the second delay amount.

The invention also provides a transmission circuit to be used in a mobile communications system which has a plurality of base stations for synthesizing and transmitting a plurality of input signals as a transmission signal and transmits the transmission signal from each of the base stations with a matched transmission timing, characterized by having first delay means for giving a delay of a predetermined resolution to each of the input signals, synthesizing means for synthesizing a plurality of output signals output from the first delay means to acquire a synthesized signal, second delay means for giving a delay of a high resolution to the synthesized signal to acquire the transmission signal, and control means for computing a first delay amount which is a maximum value that does not exceed a predetermined delay amount and can be given by a delay with the predetermined resolution, instructing the first delay means the first delay amount, computing a second delay amount which is the first delay amount subtracted from the predetermined delay amount and instructing the second delay means the second delay amount.

If the first and second delay means are constituted by a FIFO memory, for example, a memory with (the amount of data for an adjusting range)+(the magnification of the resolution of the second delay means with respect to the first delay means) will do in the transmission circuit of the invention whereas the conventional transmission circuit requires a memory with (the amount of data for an adjusting range)×(the magnification of the resolution of the second delay means with respect to the first delay means). That is, it is possible to realize a transmission circuit which can give a delay of a high resolution with a smaller circuit scale.

Further, if the resolution of the second delay means is set equal to the sampling period of the output signal of the transmission filter, the function of performing up-sampling can be achieved by the transmission filter that is essential in a transmitter, thus making it unnecessary to separately perform up-sampling.

BEST MODE FOR CARRYING OUT THE INVENTION

The invention will now be described with reference to the drawings.

Figure 1:
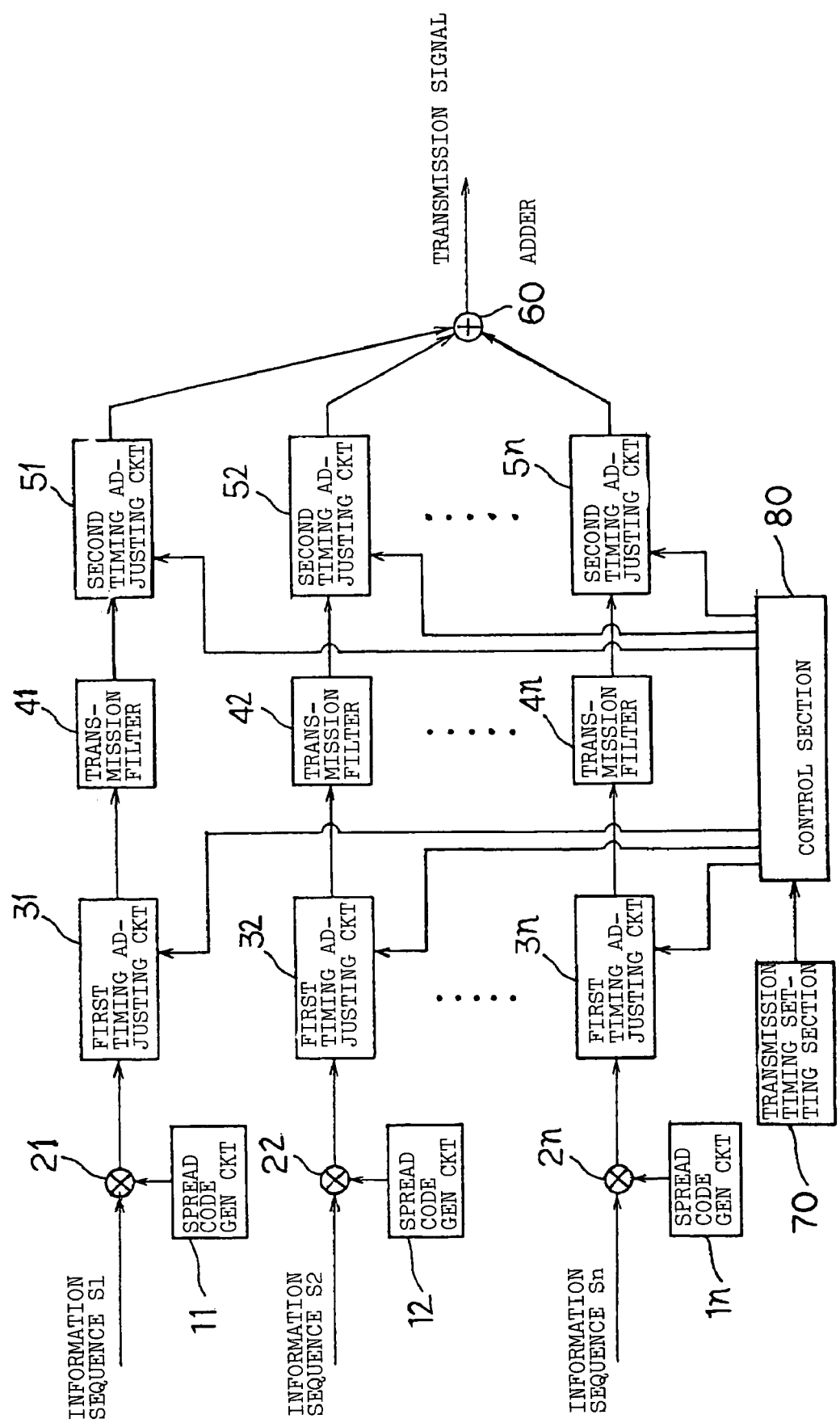
FIG. 1 is a block diagram showing one example of a transmission circuit for CDMA communication according to the invention.

Referring to FIG. 1, information sequences S1 to Sn (n being an integer equal to or greater than 2) are information sequences to be transmitted. Spread code generating circuits 11 to 1n respectively generate spread codes to be used to spread the information sequences S1 to Sn. Multipliers 21 to 2n respectively multiply the information sequences S1 to Sn by spread codes supplied from the spread code generating circuits 11 to 1n, spread the information sequences S1 to Sn and output first to n-th spread signals.

First timing adjusting circuits 31 to 3n are controlled by a control section 80 and adjust transmission timings by respectively giving delays which are i times (hereinafter, i is called a first delay stage quantity. i is an integer equal to or greater than 1) the sampling periods of spread codes to output signals of the multipliers 21 to 2n (first to n-th spread signals). For example, the first timing adjusting circuits 31 to 3n each of which is constituted by a FIFO memory hold input signals (i.e., the first to n-th spread signals) by times to be delayed by giving a difference of an i address to a write address and a read address which are to be simultaneously accessed, and then output them.

Transmission filters 41 to 4n are transmission filters which limit the frequency components of output signals of the first timing adjusting circuits 31 to 3n (hereinafter respectively called first to n-th first timing output signals) and form transmission waves, and are oversampling filters which output signals of a shorter period (hereinafter called an oversampling period) than the sampling period of spread codes.

Second timing adjusting circuits 51 to 5n are controlled by the control section 80 and adjust transmission timings by respectively giving delays which are j times (hereinafter, j is called a second delay stage quantity. j is an integer equal to or greater than 1) the oversampling period to output signals of the transmission filters 41 to 4n (hereinafter respectively called first to n-th filter output signals).

For example, the second timing adjusting circuits 51 to 5n each of which is constituted by a FIFO memory hold input signals by times to be delayed by giving a difference of a j address to a write address and a read address which are to be simultaneously accessed, and then output them.

A synthesizer 60, which is, for example, an adder, synthesizes output signals of the second timing adjusting circuits 51 to 5n (hereinafter respectively called first to n-th second timing output signals) to generate a transmission signal.

A transmission timing setting section 70 instructs the control section 80 a desired delay amount at its base station. The control section 80 computes the first delay stage quantity and the second delay stage quantity based on the delay amount instructed by the transmission timing setting section 70, instructs the first timing adjusting circuits 31 to 3n the first delay stage quantity and instructs the second timing adjusting circuits 51 to 5n the second delay stage quantity.

As mentioned above, as the transmission timing setting section 70 instructs a predetermined delay amount, the control section 80 computes the first delay stage quantity and the second delay stage quantity from the instructed delay amount, instructs the first timing adjusting circuits 31 to 3n the first delay stage quantity and instructs the second timing adjusting circuits 51 to 5n the second delay stage quantity.

Meanwhile, the information sequences S1 to Sn are multiplied by the spread codes generated by the spread code generating circuits 11 to 1n and spread by the multipliers 21 to 2n to become the first to n-th spread signals. Then, the first to n-th spread signals are given to the first timing adjusting circuits 31 to 3n.

The first timing adjusting circuits 31 to 3n respectively delay the first to n-th spread signals by giving a difference of the first delay stage quantity instructed by the control section 80 to the write address and read address which simultaneously access the FIFO memories, and output the first to n-th first timing output signals. Then, the first to n-th first timing output signals are respectively input to the transmission filters 41 to 4n. The transmission filters 41 to 4n respectively limit the frequencies of the first to n-th first timing output signals, perform up-sampling by interpolating the sampling period and output the first to n-th filter output signals to the second timing adjusting circuits 51 to 5n.

The second timing adjusting circuits 51 to 5n respectively delay the first to n-th filter output signals by giving a difference of the second delay stage quantity instructed by the control section 80 to the write address and read address which simultaneously access the FIFO memories, and output the first to n-th second timing output signals. Then, the first to n-th second timing output signals are synthesized by the adder 60 to be a transmission signal.

Figure 2:
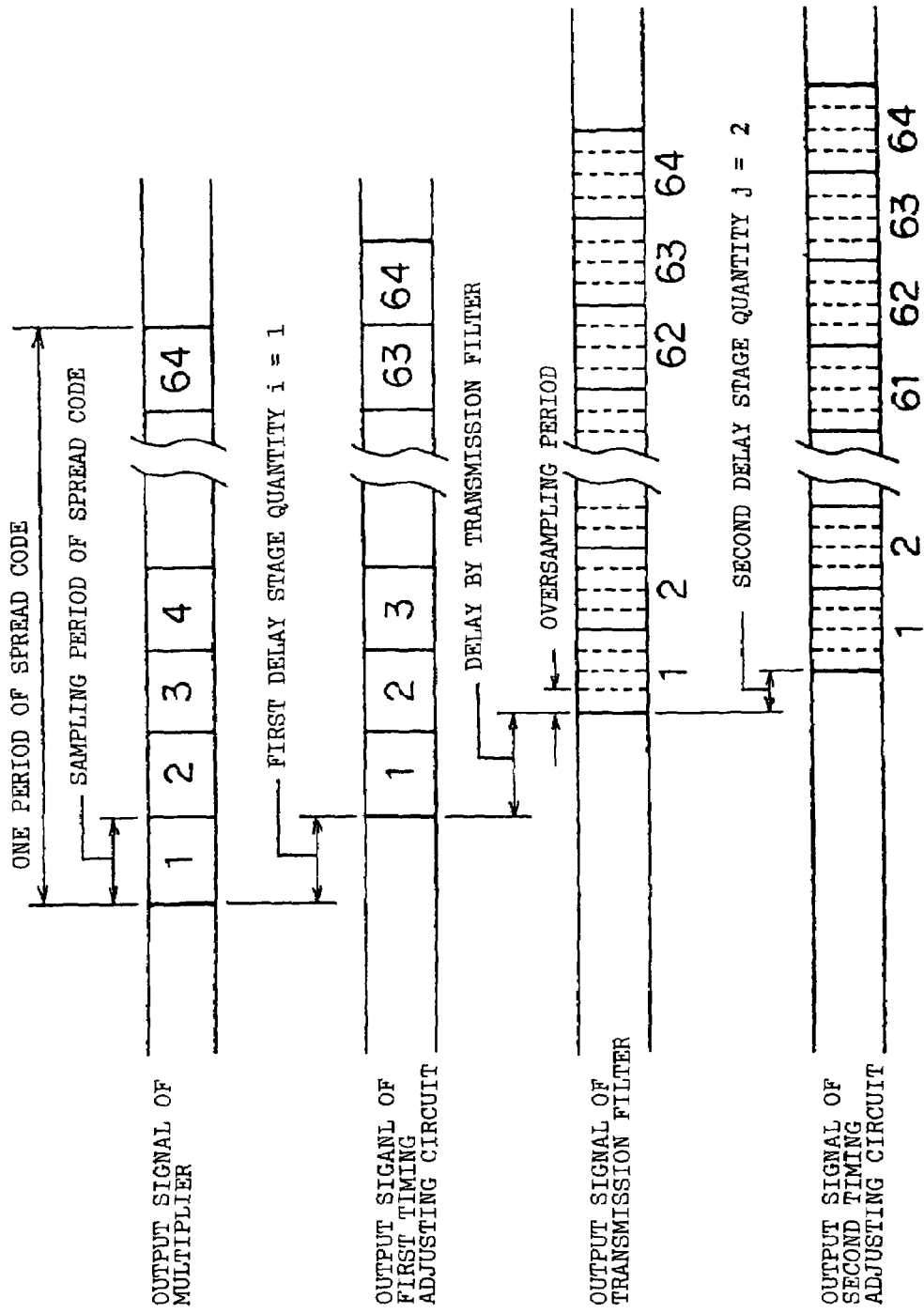
FIG. 2 is a timing chart for explaining timing adjustment in the transmission circuit shown in FIG. 1.

Here, referring also to FIG. 2, the resolution of the second timing adjusting circuits 51 to 5n is, for example, four times the resolution of the first timing adjusting circuits 31 to 3n. That is, a case where the transmission filters 41 to 4n perform quadruple up-sampling is illustrated. The period of the spread codes is 64 octets. The predetermined delay amount is, for example, six stages in terms of the resolution of the second timing adjusting circuits 51 to 5n.

As mentioned above, the control section 80 which has been instructed the predetermined delay amount by the transmission timing setting section 70 instructs the first delay stage quantity i=1 the first timing adjusting circuits 31 to 3n and instructs the second delay stage quantity j=2 the second timing adjusting circuits 51 to 5n.

The first to n-th spread signals which are respectively output from the multipliers 21 to 2n are first subjected to a delay of a first stage by the first timing adjusting circuits 31 to 3n, then are up-sampled by the transmission filters 41 to 4n and are further subjected to a delay of a second stage by the second timing adjusting circuits 51 to 5n.

As timing adjustment is carried out by two kinds of timing adjusting circuits of different resolutions as described above, the required capacity of the FIFO memory can be small and high-resolution timing adjustment can be carried out.

In case where the period of the spread codes is 64 octets, a memory capacity of 256 (64×4) octets was needed conventionally in order to ensure a structure which can execute timing adjustment with a quadruple resolution, whereas a memory capacity of 68 (64+4) octets will do in the above-described example. That is, even if high-resolution timing adjustment is performed, an increase in circuit scale is suppressed and a transmission circuit at a low cost can be realized at a low cost.

Note that the transmission circuit is used in, for example, a base station of a CDMA mobile communications system. In this case, a base station which is able to carry out high-resolution timing adjustment can be constructed at a low cost, and, what is more, the transmission timings can be matched accurately among base stations even if the site conditions for the base stations are different. This results in an increased degree of freedom of the site conditions for base stations. That is, the transmission timing of every base station can be adjusted at the antenna end without increasing the cost of the base station. As a result, timing adjustment in a mobile unit becomes unnecessary, so that the cost of the CDMA mobile communications system can be reduced.

Figure 3:
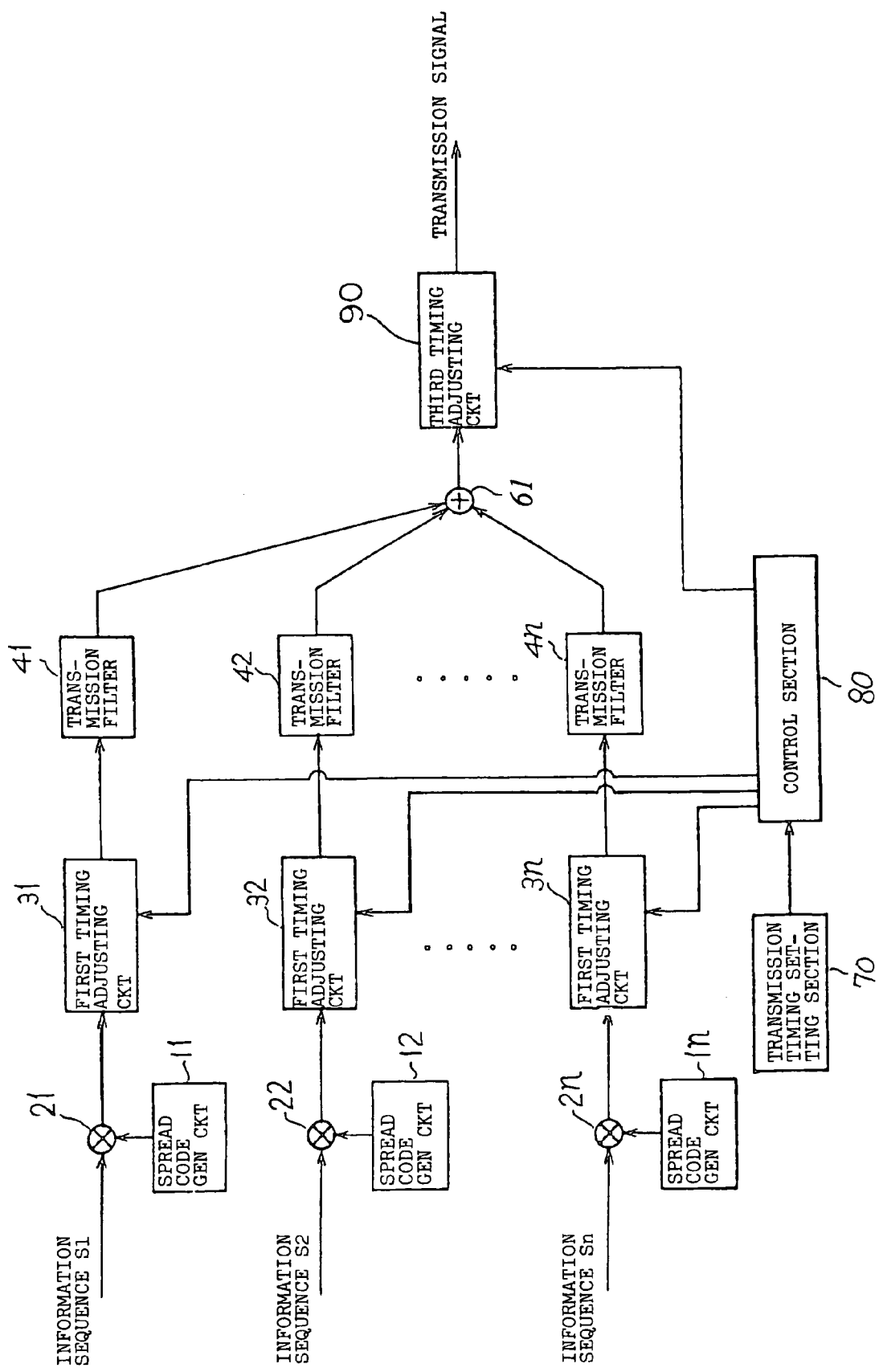
FIG. 3 is a block diagram showing another example of the transmission circuit for CDMA communication according to the invention.

Referring to FIG. 3, another example of the transmission circuit according to the invention will be explained.

The illustrated transmission circuit has a timing adjusting circuit (hereinafter called a third timing adjusting circuit) which performs a delay by k times the oversampling period (hereinafter k is called a third delay stage quantity. k is an integer equal to or greater than 1) in place of the second timing adjusting circuits 51 to 5n of the transmission circuit shown in FIG. 1, and this third timing adjusting circuit 90 is located at the subsequent stage of an adder 61. As the other structure is the same as that of the example shown in FIG. 1, its description will be omitted.

In the transmission circuit shown in FIG. 3, the control section 80 computes a first delay stage quantity and a third delay stage quantity from a delay amount instructed by the transmission timing setting section 70. Then, the control section 80 instructs the first timing adjusting circuits 31 to 3n the first delay stage quantity and instructs the third timing adjusting circuit 90 the third delay stage quantity.

As has been described in conjunction with FIG. 1, the first to n-th filter output signals are synthesized (the output signal of the adder 61 is called a synthesized signal in FIG. 3). The synthesized signal is input to the third timing adjusting circuit 90. The third timing adjusting circuit 90 gives a difference of the third delay stage quantity instructed by the control section 80 to the write address and read address which are to be simultaneously accessed to delay the synthesized signal, and outputs it as a transmission signal.

In the example shown in FIG. 3, as described above, the synthesized signal is delayed by k times the oversampling period by the third timing adjusting circuit, so that high-resolution timing adjustment can be carried out while further reducing the required capacity of the FIFO memory, i.e., suppressing an increase in circuit scale, and also reducing the cost.

Although the descriptions of the examples shown in FIGS. 1 and 3 have been given of a case where the first timing adjusting circuits, the second timing adjusting circuits and the third timing adjusting circuit 90 are constituted by memories, the first timing adjusting circuits, the second timing adjusting circuits and the third timing adjusting circuit 90 may be constituted by shift registers.

INDUSTRIAL APPLICABILITY

As described above, the invention can give a delay with a high resolution while reducing the circuit scale, so that high-resolution transmission timing adjustment can be carried out a low cost in, for example, CDMA mobile communication.

The invention claimed is:

1. A transmission circuit to be used in a mobile communications system for transmitting transmission signals from a plurality of base stations with a matched transmission timing, each of said base stations being equipped with first delay means for giving a delay of a predetermined resolution to an input signal, comprising:
    second delay means for giving a delay to an output signal of said first delay means with a higher resolution than said first delay means,
    control means for computing a first delay amount which is a maximum value that does not exceed a predetermined delay amount and can be given by said predetermined resolution, instructing said first delay means said first delay amount, computing a second delay amount which is said first delay amount subtracted from said predetermined delay amount and instructing said second delay means said second delay amount,
    transmission timing setting means for notifying said control means of said predetermined delay amount as a transmission timing, and
    a transmission filter constituted by an oversampling filter being provided between said first delay means and said second delay means, wherein:
    said resolution of said second delay means is equal to a sampling period of an output signal of said transmission filter.

2. A transmission circuit to be used in a mobile communications system which has a plurality of base stations for synthesizing and transmitting a plurality of input signals as a transmission signal and transmits said transmission signal from each of said base stations with a matched transmission timing, said input signal being a spread signal obtained by spreading an information sequence based on a spread code, comprising:
    first delay means for giving a delay of a predetermined resolution to each of said input signals,
    synthesizing means for synthesizing a plurality of output signals output from said first delay means to acquire a synthesized signal,
    second delay means for giving a delay of a high resolution to said synthesized signal to acquire said transmission signal,
    control means for computing a first delay amount which is a maximum value that does not exceed a predetermined delay amount and can be given by a delay with said predetermined resolution, instructing said first delay means said first delay amount, computing a second delay amount which is said first delay amount subtracted from said predetermined delay amount and instructing said second delay means said second delay amount, transmission timing setting means for notifying said control means of said predetermined delay amount as a transmission timing, and a transmission filter constituted by an oversampling filter being provided between said first delay means and said synthesizing means, wherein:

said resolution of said second delay means is equal to a sampling period of an output signal of said transmission filter.

3. A transmission circuit, comprising:

plurality of first timing adjusting circuits, each first timing adjusting circuit of said plurality of first timing adjusting circuits configured to: (i) input a corresponding spread signal of a plurality of spread signals, (ii) delay the corresponding spread signal by a first delay stage quantity, and (iii) output a corresponding first timing output signal of a plurality of first timing output signals, said plurality of first timing adjusting circuits having a first resolution for specifying the first delay stage quantity;

a plurality of transmission filters, transmission filter of the plurality of transmission filters configured to: (i) input a corresponding first timing output signal of the plurality of first timing output signals, (ii) oversample the corresponding first timing output signal in accordance with an oversampling period, and (iii) output a corresponding filter output signal of a plurality of filter output signals;

a plurality of second timing adjusting circuits, each second timing adjusting circuit of the plurality of second timing adjusting circuits configured to: (i) input a corresponding filter output signal of the plurality of filter output signals, (ii) delay the corresponding filter output signal by a second delay stage quantity, and (iii) output a corresponding second timing output signal of a plurality of second timing output signals, said plurality of second timing adjusting circuits having a second resolution for specifying the second delay stage quantity that is a higher resolution than said first resolution;

a synthesizer for synthesizing the plurality of second timing output signals to provide a transmission signal;

a plurality of spread code generating circuits, each spread code generating circuit of said plurality of spread code generating circuits configured to provide a corresponding spread code of a plurality of spread codes; and a plurality of multipliers, each multiplier of said plurality of multipliers configured to multiply a corresponding information sequence of a plurality of information sequences by a corresponding spread code of the plurality of spread codes to provide a corresponding spread signal of the plurality of spread signals;

wherein a period of each spread code of the plurality of spread codes is the same; and wherein each first timing adjusting circuit of the plurality of first timing adjusting circuits comprises a first-in-first-out (FIFO) memory with a size that is less than or equal to the period of a spread code of the plurality of spread codes.

4. The transmission circuit of claim 3, wherein a sampling period of each spread code of the plurality of spread codes is the same; and wherein each second timing adjusting circuit of the plurality of second timing adjusting circuits comprises a first-in-first-out (FIFO) memory with a size that is less than or equal to the sampling period of the spread code of the plurality of spread codes divided by the oversampling period.

5. A transmission circuit, comprising:

a plurality of first timing adjusting circuits, each first timing adjusting circuit of said plurality of first timing adjusting circuits configured to: (i) input a corresponding spread signal of a plurality of spread signals, (ii) delay the corresponding spread signal by a first delay stage quantity, and (iii) output a corresponding first timing output signal of a plurality of first timing output signals, said plurality of first timing adjusting circuits having a first resolution for specifying the first delay stage quantity;

a plurality of transmission filters, each transmission filter of the plurality of transmission filters configured to: (i) input a corresponding first timing output signal of the plurality of first timing output signals, (ii) oversample the corresponding first timing output signal in accordance with an oversampling period, and (iii) output a corresponding filter output signal of a plurality of filter output signals;

a plurality of second timing adjusting circuits, each second timing adjusting circuit of the plurality of second timing adjusting circuits configured to: (i) input a corresponding filter output signal of the plurality of filter output signals, (ii) delay the corresponding filter output signal by a second delay stage quantity, and (iii) output a corresponding second timing output signal of a plurality of second timing output signals, said plurality of second timing adjusting circuits having a second resolution for specifying the second delay stage quantity that is a higher resolution than said first resolution;

a synthesizer for synthesizing the plurality of second timing output signals to provide a transmission signal; and a control section for inputting a desired delay amount and for determining the first delay stage quantity and the second delay stage quantity based on the desired delay amount;

wherein the desired delay amount is specified in terms of the second resolution;

wherein the control section is configured to calculate the first delay stage quantity as an integer by dividing the desired delay amount by a number that represents a number of samples at the second resolution that can be obtained for every one sample at the first resolution; and wherein the control section is configured to calculate the second delay stage quantity as an integer that is a remainder of the division when calculating the first delay stage quantity.

* * * * *